United States Patent
Niere et al.

(10) Patent No.: US 12,223,301 B2
(45) Date of Patent: Feb. 11, 2025

(54) GENERATING SOURCE CODE ADAPTED FOR IMPLEMENTATION ON FPGAS

(71) Applicant: dSPACE GmbH, Paderborn (DE)

(72) Inventors: Joerg Niere, Paderborn (DE); Kingshuk Karuri, Paderborn (DE); Pubali Mazumder, Paderborn (DE)

(73) Assignee: DSPACE GMBH, Paderborn (DE)

(*) Notice: Subject to any disclaimer, the term of this patent is extended or adjusted under 35 U.S.C. 154(b) by 173 days.

(21) Appl. No.: 18/185,413

(22) Filed: Mar. 17, 2023

(65) Prior Publication Data

US 2024/0311112 A1  Sep. 19, 2024

(51) Int. Cl.
G06F 8/41 (2018.01)

(52) U.S. Cl.
CPC ............ G06F 8/456 (2013.01); G06F 8/4441 (2013.01)

(58) Field of Classification Search
None
See application file for complete search history.

(56) References Cited

U.S. PATENT DOCUMENTS

| | | | |
|---|---|---|---|
| 9,841,954 B1 | 12/2017 | Hillebrand et al. | |
| 2006/0048122 A1* | 3/2006 | Barton | G06F 8/443 717/160 |
| 2008/0244549 A1* | 10/2008 | Kejariwal | G06F 8/456 717/160 |
| 2011/0047534 A1* | 2/2011 | Ye | G06F 8/45 717/160 |
| 2012/0117552 A1* | 5/2012 | Krishnaiyer | G06F 8/41 717/160 |
| 2012/0167068 A1* | 6/2012 | Lin | G06F 8/4434 717/160 |
| 2012/0167069 A1* | 6/2012 | Lin | G06F 8/456 717/160 |

OTHER PUBLICATIONS

Hanselmann et al., "Production Quality Code Generation from Simulink Block Diagrams," 1999, IEEE, p. 213-218. (Year: 1999).*
Franz-Josef Streit et al. "Model-Based Design Automation of Hardware/Software Co-Designs for Xilinx Zynq PSoCS", Proceedings of the 2018 International Conference on ReConFigurable Computing and FPGAs (ReConFig), Dec. 3-5, 2018, Cancun, Mexico, DOI: 10.1109/RECONFIG.2018.8641736.

(Continued)

*Primary Examiner* — Qing Chen
(74) *Attorney, Agent, or Firm* — LEYDIG, VOIT & MAYER, LTD.

(57) ABSTRACT

A method for generating source code includes: transforming a block diagram into an intermediate representation, wherein transforming the block diagram into the intermediate representation comprises transforming at least two blocks, wherein at least one loop results from transforming an operation block; identifying at least one candidate loop in the intermediate representation, wherein a loop body of a candidate loop comprises at least one instruction that accesses the array variable; identifying at least one parallelizable loop from the at least one candidate loop; determining build options for the at least one parallelizable loop and the array variable; inserting build pragmas based on the determined build options in the intermediate representation; and translating the intermediate representation into the source code.

15 Claims, 3 Drawing Sheets

(56) References Cited

OTHER PUBLICATIONS

Malik, Omer and Ahmed Hemani, "A Pragma Based Approach for mapping MATLAB Applications on a Coarse Grained Reconfigurable Architecture," 2012 25th Symposium on Integrated Circuits and Systems Design (SBCCI), IEEE, Aug. 30, 2012 (Aug. 30, 2012), pp. 1-6, XP032471251.

Nigam, Rachit et al. "Predictable Accelerator Design with Time-Sensitive Affine Types," arxiv.org, Cornell University Library, 201 Olin Library Cornell University Ithaca, NY 14853, Apr. 10, 2020 (Apr. 10, 2020), XP081641753, pp. 1-15.

\* cited by examiner

```
L1: for (i = 0; i < N1; i++)
    t1[i] = a[i] + x[i];
L2: for (i = 0; i < N1; i++)
    t2[i] = b[i] + u[i];
L4: for (i = 0; i < N2 - 1; i++)
    t4[i] = y[i - 1] + z[i - 1];
L3: for (i = 0; i < N1; i++)
    t3[i] = t1[i] + t2[i];
```

GENERATING SOURCE CODE ADAPTED FOR IMPLEMENTATION ON FPGAS

FIELD

The invention relates to generating executable code from a block diagram, in particular for programming control units.

BACKGROUND

Control devices are used in many different applications in order to record physical variables of a process and/or influence a process using connected actuators, for example an anti-lock control in a braking operation. The time constants determining the dynamic behavior of the process often require cycle times of 1 ms or less, so the control unit must have real-time capabilities. For applications such as controlling electric motors, which need cycles times in the microsecond range, control systems often comprise a programmable logic device, in particular a field-programmable gate array (FPGA). An FPGA is capable of lower latencies than a processor because its functionality is provided by circuits configured according to a bitstream read in at initialization so that it allows for parallelism in hardware. The configuration bitstream is created in a synthesis toolchain for the specific FPGA device. Both FPGAs and system-on-chip devices combining an FPGA and a microcontroller are commercially available.

To design control units more quickly, control strategies are often developed based on models in a computing environment such as MATLAB/Simulink. Therefore, the process and/or the controller, or the behavior of the control unit in general, can be simulated first to check whether desired properties are present. In particular, the models may be block diagrams comprising blocks that execute operations such as calculations; by way of example, a block may calculate one output signal from a plurality of input signals. In general, block diagrams are executed cyclically, with all blocks being permanently retained in the memory and each block being executed once per time step. In particular, in each time step a block may apply one or more operations to input signals from the preceding block in order to generate output signals for the current step. Block diagrams may additionally comprise a sub-model for describing a discrete behavior in which a number of states and transition conditions are defined. Source code for programming the control unit can be generated from the models using a code generator. A code generator for generating source code in production quality is described, for example, in the document "Production Quality Code Generation from Simulink Block Diagrams", Proceedings of the 1999 International Symposium on Computer Aided Control System Design, Kohala Coast, Hawaii, H. Hanselmann et al.

The generated source code can be converted to a configuration bitstream via specialized high-level synthesis tools. A synthesis toolchain for System-on-Chip devices is described in the document "Model-Based Design Automation of Hardware/Software Co-Designs for Xilinx Zynq PSoC", Proceedings of the 2018 International Conference on RcConFigurable Computing and FPGAs (RcConfig), Cancun, Mexico, Franz-Josef Streit et al. Using the toolchain, a designer can translate a given MATLAB/Simulink model into mixed hardware and software implementations, interconnected by dedicated interfaces. To efficiently use the FPGA, compiler directives, also called pragmas, for specifying build options are inserted automatically. A common build options is to apply automatic loop pipelining, thus increasing the throughput by the overlapped processing of data from multiple loop iterations in different stages of the calculation. New data are accepted after an initiation interval of at least one clock cycle. After a latency depending on the number of calculation stages to produce the first result, one subsequent result is output each initiation interval. However, the discussed method does not exploit the possible speedup of FPGA configurations involving parallel processing of multiple input values.

SUMMARY

In an exemplary embodiment, the present invention provides a method for generating source code from one or more blocks of a block diagram that comprises at least two blocks, including a source block emitting a matrix signal corresponding to an array variable and an operation block receiving the matrix signal and emitting an output signal based on an operation applied to the matrix signal. The method includes: transforming the block diagram into an intermediate representation, wherein transforming the block diagram into the intermediate representation comprises transforming the at least two blocks, wherein at least one loop results from transforming the operation block; identifying at least one candidate loop in the intermediate representation, wherein a loop body of a candidate loop comprises at least one instruction that accesses the array variable; identifying at least one parallelizable loop from the at least one candidate loop; determining build options for the at least one parallelizable loop and the array variable; inserting build pragmas based on the determined build options in the intermediate representation; and translating the intermediate representation into the source code.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
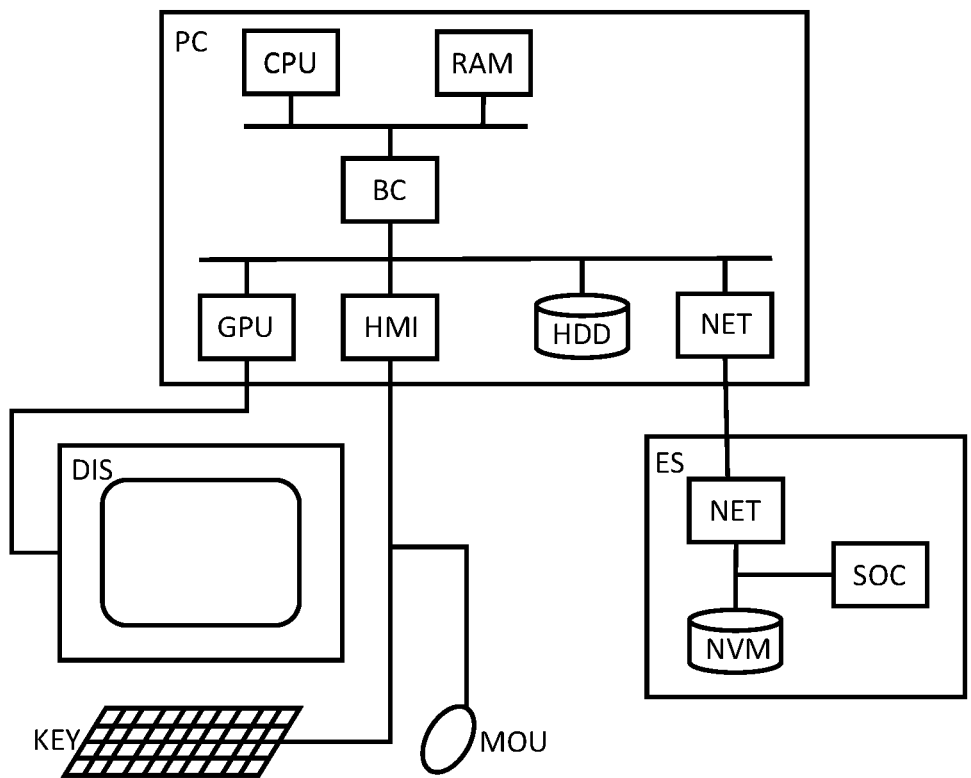
FIG. 1 shows an embodiment of a computer system.

Exemplary embodiments of the present invention provide for automatically generating build pragmas that lead to better utilization of logic circuits available on FPGAs.

In an exemplary embodiment, the present invention provides a method for generating source code from one or more blocks of a block diagram that comprises at least two blocks, a source block emitting a matrix signal corresponding to an array variable and an operation block receiving the matrix signal and emitting an output signal based on an operation applied to the matrix signal. The method comprises transforming the block diagram into an intermediate representation, wherein transforming the block diagram into the intermediate representation comprises transforming the at least two blocks, wherein at least one loop results from transforming the operation block; identifying at least one candidate loop in the intermediate representation, wherein the loop body of the candidate loop comprises at least one instruction that accesses the array variable; identifying at least one parallelizable loop from the at least one candidate loops; determining build options for the at least one parallelizable loop and the array variable; inserting build pragmas based on the determined build options in the intermediate representation; and translating the intermediate representation into source code.

Exemplary embodiments of the present invention aid the generation of source code from block diagrams that comprises build pragmas allowing for better utilization of logic circuits available on FPGAs. By unrolling loops and using parallelization in hardware, considerable increases in execution speed are possible.

A method is thus provided for generating source code from one or more blocks of a block diagram that comprises at least two blocks, a source block emitting a matrix signal corresponding to an array variable and an operation block receiving the matrix signal and emitting an output signal based on an operation applied to the matrix signal. The method comprises transforming the block diagram into an intermediate representation, wherein transforming the block diagram into the intermediate representation comprises transforming the at least two blocks, wherein at least one loop results from transforming the operation block; identifying at least one candidate loop in the intermediate representation, wherein a loop body of the candidate loop comprises at least one instruction that accesses the array variable; identifying at least one parallelizable loop from the at least one candidate loops; determining build options for the at least one parallelizable loop and the array variable; inserting build pragmas based on the determined build options in the intermediate representation; and translating the intermediate representation into source code. Preferably, the build options comprise processing the loop body for at least two iterations of the parallelizable loop in parallel. Preferably, a loop body comprises the instructions that are executed at least once for each iteration of the loop.

A matrix signal is a signal that corresponds to an array variable comprising a plurality of identical elements, wherein individual elements can preferably be addressed via indices. In this respect, a vector is a one-dimensional matrix. A method according to the invention is also applicable to matrix signals of higher dimensions, such as two-dimensional matrix signals. An effective parallelization is possible in particular for loops in which one index is monotonically changing, whereas the other indices are loop-invariant, i.e. each of the other indices remains unchanged for all iterations of the loop. A monotonically changing index may in particular increase from one iteration to the next; a method according to the invention is applicable for a monotonically increasing index as well as a monotonically decreasing index. This implies that the array is accessed sequentially along only one dimension for operations in the loop and these operations can be executed in parallel because there is no dependency between them.

Advantageously, the method according to an embodiment of the invention allows for an optimized implementation of a parallelizable loop in an FPGA. By parallelization in hardware, two or more iterations of the loop can be executed in parallel. Based on the available resources and the complexity of the loop, different unroll factors, i.e. number of parallelly executed iterations are possible. Parallelization can be specified by inserting an unroll pragma in the source code. Because the execution time is inversely proportional to the unroll factor, a significantly increased calculation speed is possible. To maximize the increase in calculation speed, preferably the maximum unroll factor compatible with the available resource is chosen. The method preferably also determines build options for each array accessed in a parallelizable loop. Based on the unroll factor, a partition factor for the array may be determined. Partitioning the array can be specified by inserting a partition pragma in the source code. This allows for the creation of multiple smaller arrays that can be placed in multiple memory banks and thus accessed in parallel from multiple loop iterations. An implementation toolchain can generate the FPGA configuration for a specific device based on the build pragmas. Thus, automatic pragma insertion according to an embodiment of the invention frees developers from time-consuming manual optimizations. Because block diagrams can be transformed without manually redoing the build pragmas, iteratively developing the model is encouraged. The generated source code also allows for a processor-based Software-in-the-Loop simulation, so that a seamless transition from processor-only devices to systems comprising a programmable logic device is possible.

In an embodiment, identifying at least one parallelizable loop comprises performing one or more checks on a candidate loop, as discussed below.

determining that the instructions of the loop body either do not introduce data dependencies between different iterations of the candidate loop or only introduce an accumulator dependency, wherein for an accumulator dependency, each loop iteration writes one value to a fixed memory location, wherein the value written in the current iteration is calculated based on the value written in the preceding iteration;

The absence of data dependencies between iterations allows for freely determining an unroll factor for the loop. If the only data dependency between iterations is limited to an accumulator dependency, unrolling the loop remains possible.

determining that for any array accessed in the loop body, for any array accessed in the loop body, at most one index for a single dimension changes monotonically, whereas all other indices for all other dimensions are loop-invariant;

The array may be a one-dimensional array, wherein the only dimension is accessed with monotonically changing index. For a two-dimensional array, each access needs to occur with either the first index being loop-invariant and the second index monotonically changing or the first index being monotonically changing and the second index being loop-invariant. The term loop-invariant refers to an expression that remains unchanged for each iteration of the current loop. For an accumulator dependency, a single array element may be accessed with loop-invariant indices. When an array is accessed only with invariant indices, so that the same element is accessed in each loop iteration, this array need not be partitioned.

determining that there is no break or return statement in the loop body;

determining that there is no address or pointer operation;

By stipulating that there is no break or return statement in the loop body, as well as ascertaining the absence of address or pointer operations, thus ensuring that no unpredictable control flow occurs, the loop can easily be analyzed for the best build options.

determining that there is no inner loop nested in the candidate loop;

determining that the maximum number of iterations of the candidate loop is fixed via expressions whose value can be determined when generating the code.

The presence of an inner loop or a variable expression for the maximum number of iterations would necessitate introducing additional control circuitry in the FPGA configuration, thus reducing or completely neutralizing any increase in calculation speed achievable by parallelization. Array accesses with monotonically changing, in particular increasing, array indices are common for matrix operations, and an accumulator dependency is common for matrix multiplications. Thus, the present method is well suited for typical source code generated from block diagrams for model-based design of control systems.

In an embodiment, determining a build option for the at least one parallelizable loop comprises determining an unroll factor based on the maximum number of iterations of the parallelizable loop and the resources available on the programmable logic device, and determining a build option for the accessed array variable comprises determining a partition factor based on the unroll factor of the parallelizable loop accessing the array variable. Partitioning the array variable into multiple smaller arrays, wherein subsequent elements of the array are located in different partitions, ensures a sufficient memory bandwidth for parallel processing of the unrolled loop. When the array variable is placed in a dual-port memory, such as Block Rams in an FPGA, the partition factor is preferably determined as the unroll factor divided by 2 for even unroll factors. For odd unroll factors, the partition factor is preferably determined to be the same as the unroll factor.

In an embodiment, determining a build option for the at least one parallelizable loop comprises determining an unroll factor, wherein the unroll factor is determined by optimizing a cost-benefit ratio between increased calculation speed and increased resource consumption. Unrolling a loop refers to a parallel execution of the loop body for a plurality of iterations. When the loop bodies for all iterations of a loop are executed in parallel, the loop is unrolled completely and the execution speed for the loop is maximized. However, the resource consumption of completely unrolling the loop may be excessive. Thus, the best overall result may be obtained by optimizing a ratio between calculation speed and resource consumption or increased calculation speed and increased resource consumption.

In an embodiment, the resource consumption of a loop is determined by adding the specific resource consumption for each operation in the loop body, wherein the specific resource consumption is read out from an operation library. The operation library may be specific for a particular programmable logic device and allows for defining properties such as resource consumption and execution speed for individual operations that may be used in the loop bodies of the source code. The term operation may refer to any arithmetic, logical, relational or other mathematic operation (such as a square root or trigonometric function). The operation library may be implemented as an XML file that specifies the latency and resource consumption for a plurality of operations; it may be specific to a particular FPGA device and to a specific clock period. By using different or adapted operation libraries, a method according to the invention can be applied to different programmable logic devices.

In an embodiment, the latency of a loop is determined based on the specific latency for each operation in the loop body, and the specific latency is read out from an operation library. Determining the latency of a loop allows for estimating the benefit of unrolling the loop. When there is no data dependency between different loop iterations, the latency of a loop can be determined by adding the latencies of each operation in the loop body.

In an embodiment, the operation library is determined by implementing code comprising the different possible operations in a specific programmable logic circuit, wherein the specific resource consumption and/or the specific latency is measured from the implemented code. Once a particular FPGA device is available, the operation library for it can automatically be generated by a software module that implements different operations for the device using a high-level synthesis tool chain of the device manufacturer. Based on the build result, resource consumption and latency of individual operations can be determined. By automatically implementing the operations for varying data type and/or clock period, the software module can determine the influence of these parameters on latency and resource consumption.

In an embodiment, for multiple parallelizable loops, the unroll factors of the parallelizable loops are determined by optimizing a combined cost-benefit function for the parallelizable loops, wherein the available resources of a specific programmable logic device form a boundary condition that needs to be fulfilled. The resources available on the programmable logic device may not allow for completely unrolling each loop present in the generated code for implementing the control program. Thus, the unroll factors of all loops are preferably optimized with respect to a maximum execution speed for the entire source code of the control algorithm.

In an embodiment, for multiple parallelizable loops and/or multiple accessed array variables, one or more of the following constraints are imposed:

The unroll factor for each parallelizable loop accessing a specific array is the same;

The partition factor for multiple array variables accessed in the same parallelizable loop is the same.

The partition factor constraint applies only to those array variables that are accessed with a loop-variant index in at least one loop. Imposing these constraints ensures a suitable memory bandwidth for the unrolled loops while ensuring that the additional logic for implementing the partitioned arrays does not reduce the benefits of parallelization.

In an embodiment, determining build options for multiple parallelizable loops and array variables comprises determining a cluster of interdependent parallelizable loops and array variables, wherein for a first parallelizable loop being in the cluster, each array variable accessed by the first parallelizable loop is added to the cluster, wherein for a first array variable being in the cluster, each parallelizable loop accessing the first array variable is added to the cluster, wherein the unroll factor for all parallelizable loops in the cluster is chosen based on optimizing a combined cost-benefit ratio for the cluster, the combined cost-benefit ratio being calculated by adding the cost for all loops in the cluster, adding the benefit for all loops in the cluster and determining the ratio of both sums. Arrays that are only accessed with constant indices may be disregarded when determining the cluster.

In an embodiment, inserting build pragmas based on the determined build options in the modified intermediate representation comprises one or more of:

inserting an unroll pragma for the at least one parallelizable loop;
inserting a partition pragma for the array variable, wherein the partition pragma specifies partitioning the array in a number of smaller arrays, wherein subsequent elements of the array variable are located in different smaller arrays;
inserting a pipeline pragma for at least one loop, wherein pipeline pragmas may be inserted in any loop that is not completely unrolled.

Inserting an unroll pragma instructs the implementation toolchain to unroll the parallelizable loop either completely or with a defined factor. This allows for exploiting the parallelism available on programmable logic circuits. Partition pragmas are inserted only for those arrays which are accessed with one monotonically changing loop-variant index. Inserting a partition pragma for the array variable accessed in the parallelizable loop instructs the implementation toolchain partitioning the array in a number of smaller arrays, wherein subsequent elements of the array variable are located in different smaller arrays. This ensures a sufficient memory bandwidth, because iterations of the unrolled loop that are executed in parallel can access multiple array elements from multiple smaller arrays in different memory banks. Inserting a pipeline pragma for at least one loop instructs the implementation toolchain to add circuitry for efficiently processing data in each clock cycle after an initialization of the pipeline. Because pipelined processing introduces very little resource consumption, the pipeline pragma may be applied to any loop that is not completely unrolled. This increases the execution speed for any loop not suitable for the major increase in calculation speed resulting from unrolling the loop.

In an embodiment, the intermediate representation comprises at least one function body, the method further comprising:
determining a resource consumption of the function body;
determining a number of calls to the function; and
inserting a function inlining pragma in the intermediate representation based on the resource consumption being lower than a predefined resource threshold and the function being called less often than a predefined call threshold.

Inserting a function inlining pragma instructs the implementation tool chain to replace a function call with the entire function body at the call site. Functions are modelled as separate modules in hardware, and a function call generally requires one extra cycle to route signals to the module inputs. Thus, for small functions that are called a limited number of times, the calculation speed can be increased without excessive resource consumption.

The invention further relates to a method for configuring a control unit, wherein the control unit comprises at least one programmable logic device, the method comprising:
generating source code with a method according to an embodiment of the invention;
implementing the source code for execution on the programmable logic device via a high-level synthesis toolchain to generate a bitstream, wherein the bitstream depends on the build pragmas,
transmitting the bitstream to the control unit; and
storing the bitstream on a non-volatile memory of the control unit and/or configuring the programmable logic device of the control unit with the bitstream.

The invention further relates to a non-transitory computer-readable medium having processor-executable instructions stored thereon for generating source code from one or more blocks of a block diagram that comprises at least two blocks, a source block emitting a matrix signal corresponding to an array variable and an operation block receiving the matrix signal and emitting an output signal based on an operation applied to the matrix signal, wherein the processor-executable instructions, when executed, facilitate:
transforming the block diagram into an intermediate representation, wherein transforming the block diagram into the intermediate representation comprises transforming the at least two blocks;
identifying at least one candidate loop in the intermediate representation, wherein the loop body of the candidate loop comprises an instruction that accesses the array variable;
identifying at least one parallelizable loop from the at least one candidate loops;
determining a build option for the at least one parallelizable loop;
determining a build option for the array variable;
inserting build pragmas based on the determined build options in the intermediate representation; and
translating the intermediate representation into source code.

The invention furthermore relates to a computer system comprising a human-machine interface, a non-volatile memory, and a processor, wherein the processor is configured to carry out a method according to the invention.

The invention will now be described in more detail with reference to the drawings, in which like parts are designated by the same reference signs. The illustrated embodiments are schematic, i.e., the distances and the lateral and vertical dimensions are not necessarily true to scale and, unless indicated otherwise, do not have any derivable geometric relationships to each other either.

FIG. 1 shows an example configuration of a computer system PC. The computer system has a processor CPU, which may in particular be implemented as a multi-core processor, a main memory RAM, and a bus controller BC. The computer system PC is preferably configured to be manually operated directly by a user, a monitor DIS being connected via a graphics card GPU, and a keyboard KEY and a mouse MOU being connected via a peripheral interface HMI. The human-machine interface of the computer system PC may also be configured as a touch interface. The computer system further comprises a non-volatile data store HDD, which may in particular be configured as a hard disk and/or solid-state disk, as well as an interface NET, in particular a network interface. A control unit ES may be connected via the interface NET. One or more interfaces of any type, in particular wired interfaces, may be provided on the computer system PC and may each be used for connecting to a control unit ES. Expediently, a network interface in accordance with the Ethernet standard may be used; the interface NET may also be wireless, in particular configured as a WLAN interface or in accordance with a standard such as Bluetooth.

The control unit ES may be configured as a series control unit or as an evaluation board for a target platform. Expediently, it comprises an interface NET for connecting a system-on-chip SOC, comprising a processor and a programmable logic device, and a non-volatile memory NVM to the computer system PC. The programmable logic device comprises programmable logic blocks, typically combining look-up tables and flip flops, reconfigurable interconnects and block rams; furthermore, it may comprise dedicated circuitry such as digital signal processing blocks. When a bitstream is written to a configuration memory of the programmable logic device, the circuits are configured accordingly. In alternative embodiments, the control unit ES comprises a processor and a programmable logic device as separate chips on a printed circuit board. Embodiments of the invention are applicable irrespective of the packaging of the programmable logic device.

Figure 2:
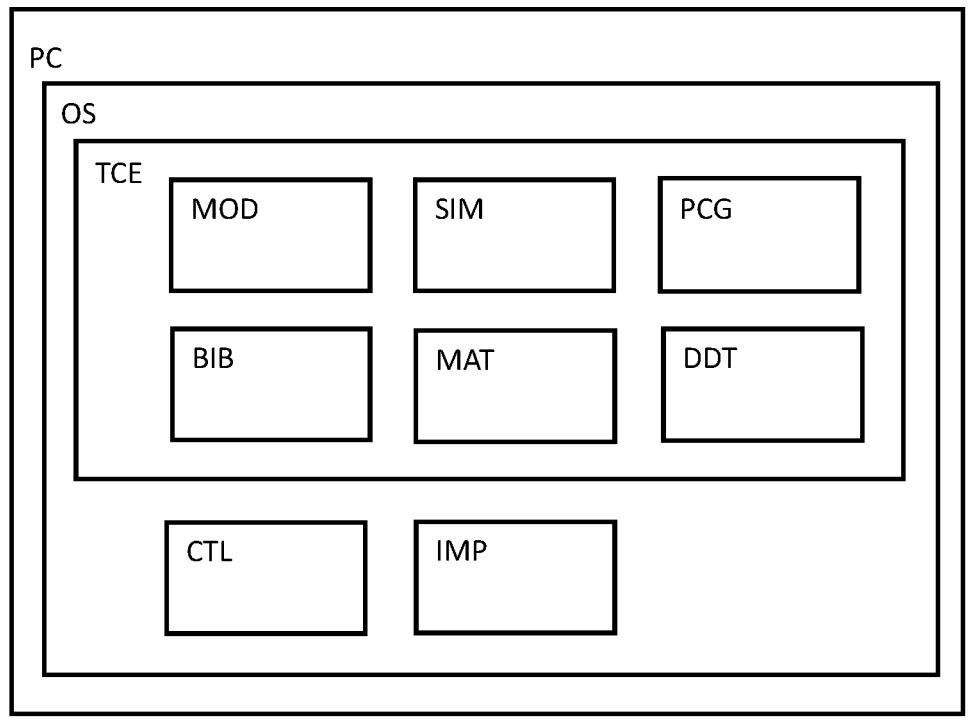
FIG. 2 is a schematic illustration of software components that are present in a computer system.

FIG. 2 shows a diagram of the software components that are preferably installed on the computer system PC. These software components use mechanisms of the operating system OS to, for example, access the non-volatile memory HDD or to establish a connection to an external computer via the network interface NET.

A technical computing environment TCE allows models to be created and source code to be generated from the models. In a modeling environment MOD, models of a dynamic system may be created, preferably via a graphical user interface. In particular, these may be block diagrams comprising a plurality of blocks and describing the behavior over time and/or internal states of a dynamic system. At least some of the blocks are linked via signals, i.e., directional links for exchanging data, which may be scalar or composite. Blocks may be atomic, i.e., may, from the perspective of the surrounding blocks, form a unit in which all the input signals have to be applied at the start of a computing step and all the output signals have to be present at the end of a computing step. If block diagrams are hierarchical, a multiplicity of blocks in a subordinate plane may describe the construction of a block in a superordinate plane. Hierarchical or composite blocks may comprise a multiplicity of blocks in a subordinate plane, even if said blocks are atomic. In particular, composite blocks may be subsystems; subsystems may have additional properties, such as implementation in a separate function and/or triggering of the execution of the subsystem via a dedicated signal. Special blocks may be arranged in subsystems to further specify the properties of the subsystem. The computing environment TCE comprises one or more libraries BIB from which blocks or modules for building a model may be selected. In a script environment MAT, instructions may be input interactively or via a batch file in order to perform calculations or modify the model. The computing environment TCE further comprises a simulation environment SIM that is configured to interpret or execute the block diagram in order to examine the behavior of the system over time. These calculations are preferably carried out using high-precision floating-point numbers on one or more cores of the microprocessor CPU of the computer system.

Preferably, a source code may be generated in a programming language such as C from a created model using a code generator PCG. Additional information on the model, in particular on the block variables, is expediently stored in a definition data pool DDT. Expediently, value ranges and/or scales are allocated to the block variables to assist with the calculation of the model using fixed-point instructions. Desired properties of the source code, for example conformity with a standard such as MISRA, may also be set or stored in the definition data pool DDT. Expediently, each block variable is allocated to a predetermined variable type, and one or more desired properties are set, for example the allowability of optimizations such as merging variables. The code generator PCG preferably analyzes the settings of the definition data pool DDT and takes them into account when generating the source code. The definition data pool DDT may have a tree structure or be stored as a simple file in a memory of the computer system; alternatively, the definition data may be stored in a dedicated database system. The definition data pool may have a program interface and/or import/export functions.

Block diagrams for control algorithms commonly comprise port blocks that emit or receive matrix signals comprising multiple elements and processing blocks that receive one or more matrix signals, apply an operation to each element and emit a matrix signal. An example operation may be the element-wise addition of two matrix signals with the same dimensions, resulting in a further matrix signal of the same dimension. For an addition of two one-dimensional matrix signals, i.e. vectors, the code generator PCG typically generates a for loop with the number of elements as exit threshold. In the body of the for loop, array variables corresponding to the matrix signals are accessed, wherein an iteration accesses the element specified by the running index. A common operation for two-dimensional matrix signals is the calculation of a matrix multiplication; the generated source code typically comprises two nested for loops. In the inner loop, only one index per array variable changes, whereas the other index has some fixed value that does not change (until the next iteration of the outer loop). The structure of source code generated from block diagrams is well adapted to an optimization according to embodiments of the invention.

On the computer system, a control program CTL and an implementation toolchain IMP are installed. The control program allows for configuring the embedded system ES, e.g. to write a newly created bitstream in the non-volatile memory NVM. The implementation toolchain IMP is configured to perform a high-level synthesis based on the C code with pragmas from the production code generator. A common intermediate form in the implementation is a description of the desired functionality at a Register Transfer Level (RTL) abstraction level in a hardware description language such as Verilog or VHDL. Hardware description languages are adapted to model concurrency and parallelism of hardware. Tools for converting an RTL description to a bitstream adapted to a specific programmable logic device are available from FPGA manufacturers. An exemplary implementation toolchain comprises Vivado HLS from Xilinx and bitstream conversion tools as part of the Vivado Design Suite, also from Xilinx.

When converting an algorithm in a high-level language such as C to an RTL description, scheduling is an important step. A hardware implementation allows for parallel execution of multiple operations, provided there are no data dependencies between the operations. In addition, operation chaining may be performed to schedule a dependent operation in the same cycle as its predecessor. The amount of chaining possible depends on the clock period of the FPGA. In a further step, operations are bound to resources in the FPGA fabric. For instance, a multiplication operation may be bound to a DSP block. Additionally, registers may be introduced between the operations to allow for a proper functioning at higher clock speeds. Subsequently, a controller implementation is generated that creates suitable control signals for the scheduled and bound algorithm. Finally, an RTL description of the scheduled and bound algorithm and the controller implementation is generated. Operation of the bitstream conversion tools can be adapted via build pragmas for specifying build options.

Figure 3:
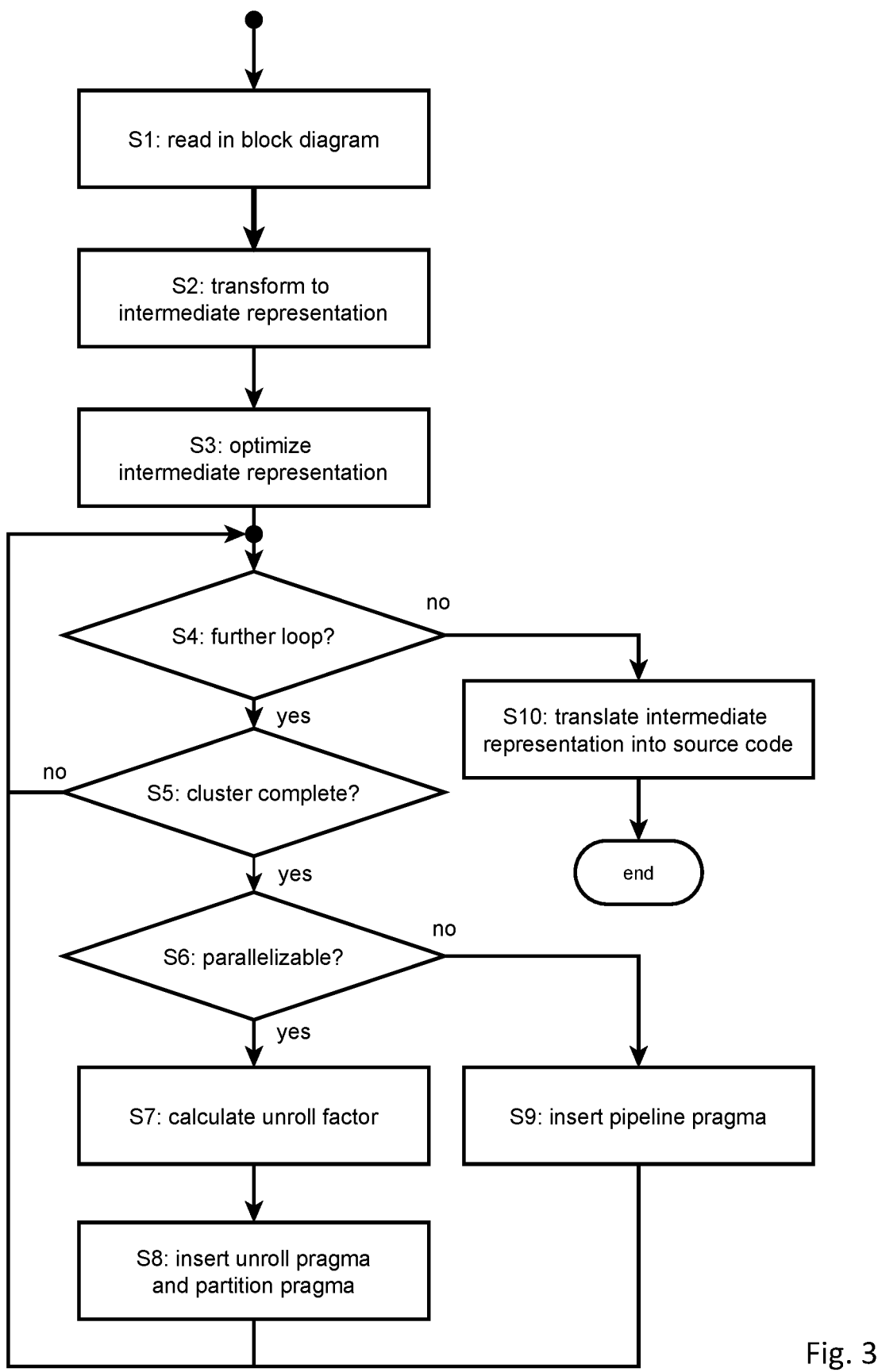
FIG. 3 shows a schematic flowchart of an embodiment of a method according to the invention for generating source code.

FIG. 3 is a schematic flowchart of an embodiment of a method according to the invention for generating source code. The method may be executed entirely by a processor of an example embodiment of the computer system PC; however, it may also be intended for execution in a clientserver environment having an operator computer and one or more servers linked over a network, in which case computationally intensive steps may be carried out on the servers.

In step S1 (read in block diagram), a block diagram is input. The block diagram comprises at least two processing blocks linked by signals and may include a multiplicity of further blocks. Expediently, inputting the block diagram also comprises reading out at least one block property and/or relevant settings for generating the code, for example the data type of a variable, from the definition data pool DDT.

In step S2 (transform into intermediate representation), the selected model is transformed from one or more blocks of the block diagram into an intermediate representation, which preferably comprises one or more hierarchical graphs. These can in particular be data flow graphs, control flow graphs, or a tree structure. In addition to the block diagram, additional information from a definition data pool DDT is also expediently taken into account when generating the intermediate representation and incorporated therein. This may also include situations in which elements are generated on the basis of information in the definition data pool DDT, or in which properties of elements or relevant settings for generating the code, for example the data type of a variable, are extracted from the definition data pool DDT.

In step S3 (optimize intermediate representation), the hierarchical graphs may be optimized in order to reduce the number of variables required and/or the memory consumption, for example stack occupation, and/or the number of operations or processor instructions and/or the execution time of the source code. This optimization may comprise a multiplicity of intermediate steps in which a set of hierarchical graphs may be converted into a different set of changed hierarchical graphs by applying optimization rules. Various strategies may be applied during the optimization, such as constant folding or eliminating dead code. Thus, a plurality of further optimization rules may be applied successively, resulting in more optimized intermediate representations. The optimized intermediate representations may iteratively change from being structurally close to the initial block diagram to a representation whose properties closely resemble source code in a language such C or C++.

In step S4 (further loop?), a check is carried out as to whether the intermediate representation comprises a further candidate loop, for which potential optimizations have not been assessed yet. Only loops with loop bodies comprising an access to an array variable with a loop-variant pattern are considered as candidate loops. When a further loop for assessment is present in the intermediate representation, step S5 is performed next; otherwise the execution continues with step S10.

In step S5 (cluster complete?), for the further loop currently identified, a check is carried out as to whether a cluster of interrelated loops and array variables is complete. When the further loop only accesses one array variable that no other loop accesses, the complete cluster includes the loop and the array variable. When the further loop accesses an array variable that is also accessed by a second loop, both the further loop, the array variable and the second loop are part of the cluster. When the further loop accesses a first array variable and a second array variable, both array variables are part of the cluster. By looking at a cluster of interrelated loops and array variables, mismatches in unroll factors and partition factors are avoided, as discussed below in connection with FIG. 4. Once the cluster is complete, step S6 is performed next; otherwise, the execution continues with step S4 to check for a further loop that has not yet been assessed for parallelization. The further loop preferably is chosen by looking at loops that access array variables already being part of the cluster.

In step S6 (parallelizable?), a check is carried out as to whether the loops in the cluster are parallelizable. This check is carried out for each loop in the cluster, to ensure that all loops in the cluster are parallelizable. A parallelizable loop must fulfill the following conditions:

The instructions of the loop body either do not introduce data dependencies between different iterations of the candidate loop or only introduce an accumulator dependency, wherein for an accumulator dependency, each loop iteration writes one value to a fixed memory location, wherein the value written in the current iteration is calculated based on the value written in the immediately preceding iteration. Loops without data dependencies may be called non-accumulator loops, loops with an accumulator dependency may be called accumulator loops—these kinds of loops may be unrolled.

For any array accessed in the loop body, at most one index for a single dimension changes monotonically, whereas all other indices for all other dimensions are loop-invariant. Loops with a more complex access pattern are not suitable for unrolling and can hinder unrolling for the entire cluster.

The maximum number of iterations of the candidate loop is fixed via expressions whose value can be determined when generating the code. This can for instance be a for loop with a constant number as maximum iteration count.

There is no break or return statement in the loop body. Otherwise, unrolling a loop would require adding exit condition checks that reduce the possible speedup and increase resource consumption.

There is no address or pointer operation. Otherwise, unpredictable changes in the control and/or data flow may result.

There is no inner loop nested in the candidate loop;

If all the loops in the cluster fulfill each condition, the cluster is parallelizable and step S7 is performed next; otherwise, execution continues at step S9.

In step S7 (calculate unroll factor), a suitable unroll factor U for the parallelizable loops in the current cluster is calculated. The main principles for determining the unroll factor U of a parallelizable loop are:

The unroll factor of the parallelizable loop must be greater than or equal to the partition factor of any array accessed from it.

When the unroll factor is greater than the partition factor, any increase in calculation speed is limited by the data bandwidth of the arrays accessed in the loop body. When all arrays accessed from a loop are partitioned by a specific factor, the achievable parallelism is limited to two times that factor (provided the arrays are placed in dual port memory). Thus, when the loop is unrolled by a factor F, the arrays accessed in the loop body are to be partitioned by F/2, when F is even, or by F, when F is odd.

If a loop accesses multiple arrays, all arrays accessed from that loop are to be partitioned by the same factor.

If an array is accessed by multiple loops, all loops accessing the array are to be unrolled with the same factor.

The unroll factor U is preferably a factor of the number of iterations for all loops in the cluster, because the number of iterations of a parallelizable loop must be a multiple of the unroll factor U for best results.

The same unroll factor U is determined for all parallelizable loops in the cluster. To determine the unroll factor, a cost-benefit function for the cluster is optimized. Details of the calculation are discussed below.

In step S8 (insert unroll pragma and partition pragma), build pragmas are inserted in the intermediate representation based on the determined build options. For the parallelizable loops of the cluster, an unroll pragma is inserted. This build pragma can be inserted into the loop body and instructs the implementation toolchain to implement multiple iterations of the loop body in hardware, resulting in a corresponding resource consumption. The unroll pragma has the form "#pragma UNROLL factor=U", where U is an integer, the unroll factor determined in step S7. For the arrays of the cluster, a partition pragma is inserted. This build pragma can be inserted after the variable definition and instructs the implementation toolchain to partition an array variable into a number of smaller arrays. The partition pragma has the form "#pragma HLS ARRAY_PARTITION variable=a cyclic factor=F dim=D", where a is the name of the array, cyclic indicates that subsequent elements are to be placed in different smaller arrays, the factor F is an integer that indicates the number of smaller arrays to create, and the dimension D is an integer that indicates which dimension of the array variable is to be partitioned. The Factor F must correspond to the unroll factor U of the loop accessing the array, or for even U and dual-port memory may correspond to U/2, i.e. half the unroll factor. The dimension D is 1 for vector signals; for a two-dimensional array, D indicates the dimension of the array that is accessed with a monotonically changing index, either 1 or 2 (provided the other dimensions index is loop-invariant). For a multi-dimensional array, D indicates the dimension accessed with a monotonically changing index, whereas the other dimensions remain loop-invariant. Because accesses to the array now correspond to individual memory banks, the memory bandwidth allows for unrolling the parallelizable loops accessing the array. Preferably, for all parallelizable loops whose unroll factor is lower than the maximum number of iterations (i.e. that are not fully unrolled), a pipeline pragma is inserted (as explained in step S9).

The execution then continues with step S4 to check for a further loop that has not yet been assessed for parallelization.

In step S9 (insert pipeline pragma), a pipeline pragma is inserted for loops that are not unrolled. This build pragma can be inserted into the loop body and instructs the implementation toolchain to allow for overlapping execution of successive iterations of the loop. For this, the loop is partitioned into different stages, so that different stages of two iterations can be executed in parallel. The pipeline pragma has the form "#pragma HLS PIPELINE II=1" when the initiation interval, i.e. the number of cycles required between the starting of two consecutive iterations of calculation, is one cycle. The total latency of the loop is reduced to one cycle for each stage plus the number of iterations of the loop minus one cycle for an initiation interval of one. The execution then continues with step S4 to check for a further loop that has not yet been assessed for parallelization.

In step S10 (translate intermediate representation into source code), the optimized intermediate representation or the optimized hierarchical graphs resulting from the entirety of the intermediate steps carried out are translated into source code of a textual programming language, in particular C code or C++. In this step too, a further optimization may be carried out, in particular such that the generated instructions represent a subset of the instructions included by the language and/or the generated control structures represent a subset of the control structures included by the language. This makes it possible to satisfy precisely defined language rules. Alternatively or additionally, additional information, for example a reference between program rows and a block of the block diagram, may be generated and incorporated into the source code in particular in the form of comments in order to improve the legibility of the source code and/or simplify debugging.

Figures 4, 5:
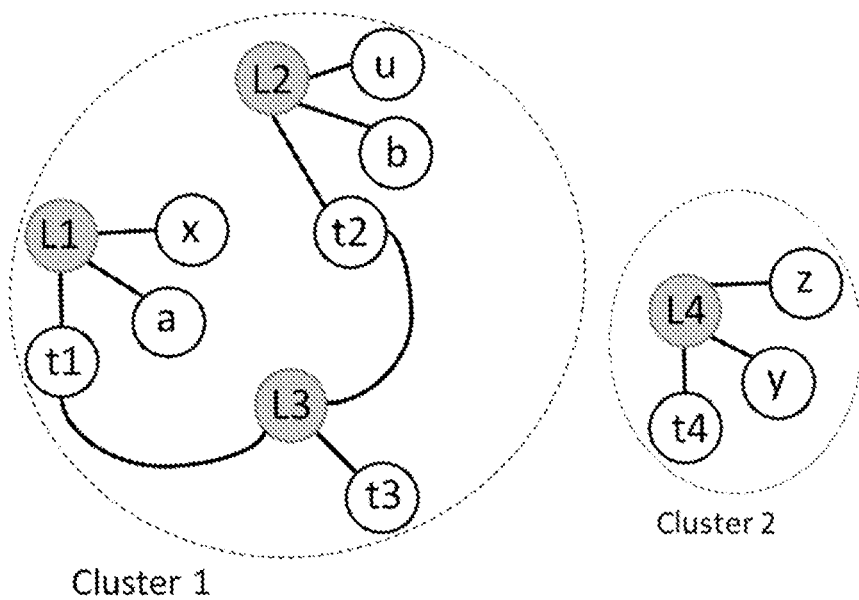
FIG. 4 depicts exemplary source code with multiple loops and multiple accessed arrays.
FIG. 5 shows graphs depicting relations between loops and arrays in the exemplary source code.

FIG. 4 depicts an exemplary source code with multiple loops and multiple accessed arrays. A first loop L1 accesses the arrays t1, a and x, wherein all the accesses are performed with a monotonically increasing index. A second loop L2 accesses the arrays t2, b and u, wherein all the accesses are performed with a monotonically increasing index. A third loop LA accesses the arrays t4, y and z, wherein all the accesses are performed with a monotonically increasing index. A fourth loop L3 accesses the arrays t3, t1 and t2, wherein all the accesses are performed with a monotonically increasing index.

Loops and arrays are grouped into clusters, wherein a cluster includes all interrelated loops and arrays, based on the principles that any loop which contains at least one non-invariant access to an array in the cluster is an element of the cluster, and any array that is accessed using a non-invariant index from a loop in the cluster. A cluster and the relations between loops and arrays can be visualized as an undirected graph where the nodes correspond to a loop or an array.

FIG. 5 shows graphs depicting the relations between loops and arrays in the exemplary source code. Cluster 1 comprises loop L1 and the arrays t1, a, and x accessed in L1. Because loop L3 also accesses t1, it also is part of cluster 1. As a result, the arrays t3 and t2 also accessed in L3 are also part of cluster 1. Because loop L2 also accesses t2, it is also part of cluster 1. As a result, the arrays b and u accessed in L2 are also part of cluster 1. When determining an optimum unroll factor U1 for the loops in cluster 1, the cost-benefit-function takes into account all the elements in cluster 1. As loop L4 accesses none of the arrays in cluster 1, it is not part of the cluster. LA and all arrays accessed in the loop are part of cluster 2. As no other loops accesses any array in the cluster, there are no further nodes in the graph for cluster 2. When determining an optimum unroll factor U2 for the loop L4, the cost-benefit function only takes into account the elements of cluster 2. A constraint relevant for all unroll factors is that the total resource consumption of the control algorithm needs to be lower than the resources available on the FPGA device that is to be used.

Build options are determined for each cluster that contains at least one parallelizable loop. Such a cluster is associated with a set of unroll factors. If all loops in a cluster are parallelizable loops and no complex access pattern hinders partitioning the arrays, the set of unroll factors comprises common arithmetic factors of all the loop iteration counts and the sizes of the arrays, because the unroll factors for the loops and the partition factors must match, and the unroll factor for each loop should be a factor of the loop iteration count for best results. If at least one loop in the cluster is not parallelizable and/or at least one loop-variant access pattern hinders partitioning an array, the only possible unroll factor is 2, provided the arrays are placed in dual-port memory banks (such as Block RAMs in the FPGA).

The resources of an FPGA comprise configurable logic blocks (CLBs), Lookup Tables (LUTs), digital signal processing blocks (DSPs) and block rams (BRAMs). The objective of the optimization is to determine an unroll factor for each cluster such that the benefits for all clusters are maximized without the cost for unrolling the loops in the clusters exceeding a specified resource consumption threshold. The resource consumption threshold may be limited to a percentage of all available resources on the FPGA.

The cost-benefit function for a loop can be calculated based on the following parameters: maximum iteration count N of the loop, unroll factor U, latency L of the loop body, and resource usage C for one loop iteration. The resource usage is considered for the particular resource types used in the loop body. Preferably, a simple additive model for resource usage of the loop body is used. Realizing an operation requires a specific number of resources of a particular type. The usage of a particular resource type can be calculated for the loop body by summing the required resources for each operation present in the loop body. For accumulator loops, a further parameter, the latency A of the accumulation operation is considered for multiple variables with an accumulator access pattern, the longest latency of any accumulation operation is considered. The cost-benefit calculations utilize a database of the latency and the number of resources for each operation. These values depend on the FPGA device and clock frequency used and can be measured as described below. By providing corresponding databases, the cost model can be used for different FPGA devices and/or clock frequencies.

The cost of a particular unroll factor U for a given resource type r can be calculated by multiplying the resource usage C for one iteration by the unroll factor, $C_{U,r}=C_r \cdot (U-1)$; the additional cost thus amounts to the unroll factor minus 1 times the resource usage C for the respective resource, as the loop body is implemented once without any unrolling. This relation holds for accumulator and non-accumulator loops. The benefit B of a particular unroll factor can be expressed in terms of clock cycles saved by unrolling. By summing the latencies for each operation in the loop body and multiplying it with the iteration count N, the estimated cycles $L_O = N \cdot L$ for the original loop can be estimated; this holds for accumulator and non-accumulator loops. When a loop is unrolled by a factor of U, the unrolled loop body is executed N/U times. For a non-accumulator loop, all unrolled iterations can be executed in parallel, so that the latency of the unrolled loop body is L. The resulting benefit is $B = N \cdot L \cdot U - 1/U$. The latency of the unrolled loop body differs for accumulator loops. Assuming that all non-accumulating portions of the loop body are executed in parallel, and that the U accumulation operations are scheduled in an inverted tree structure, the latency for an iteration of the accumulator loop can be estimated by $L + \log_2 U \cdot A$. The resulting benefit is $$B = N \cdot L - \frac{N}{U} \cdot (L + \log_2 U \cdot A).$$

More complex cost estimation models may be used in determining an optimum unroll factor. The unroll factor can be determined by optimizing the benefit-cost-function via integer linear programming or any other common optimization method.

An operation library, as a database for the latency and resource consumption for various operations can be measured automatically for different FPGA devices by providing a source code containing the various operations, defining desired datatypes for the operands, and implementing the source code for the desired FPGA device. The conversion tools of an implementation toolchain typically calculate the resource consumption for the implemented design, as this information is also utilized in the placing and routing steps. By using scripts for adapting clock speed and/or data types and invoking an application programming interface of the implementation tool chain, operation libraries can be determined automatically.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B. or the entire list of elements A. B and C.

The invention claimed is:

1. A method for generating source code from one or more blocks of a block diagram that comprises at least two blocks, including a source block emitting a matrix signal corresponding to an array variable and an operation block receiving the matrix signal and emitting an output signal based on an operation applied to the matrix signal, the method comprising:

transforming the block diagram into an intermediate representation, wherein transforming the block diagram into the intermediate representation comprises transforming the at least two blocks, and wherein at least one loop results from transforming the operation block;

identifying at least one candidate loop in the intermediate representation, wherein a loop body of the at least one candidate loop comprises at least one instruction that accesses the array variable;

identifying at least one parallelizable loop from the at least one candidate loop;

determining a build option for the at least one parallelizable loop;

determining a build option for the array variable;

inserting build pragmas based on the determined build options in the intermediate representation; and translating the intermediate representation into the source code.

2. The method of claim 1, wherein identifying the at least one parallelizable loop comprises performing one or more of the following checks on a respective candidate loop:

determining that instructions of a loop body of the respective candidate loop either do not introduce data dependencies between different iterations of the respective candidate loop or only introduce an accumulator dependency, wherein for an accumulator dependency, each loop iteration writes one value to a fixed memory location, and wherein a value written in a current iteration is calculated based on a value written in a preceding iteration;

determining that for any array accessed in the loop body of the respective candidate loop, an access index in one dimension is monotonically changing, and any other access index is loop invariant;

determining that there is no break or return statement in the loop body of the respective candidate loop;

determining that there is no address or pointer operation;

determining that there is no inner loop nested in the respective candidate loop; or determining that a maximum number of iterations of the respective candidate loop is fixed via expressions whose values are capable of being determined when generating the source code.

3. The method of claim 1, wherein determining a build option for the at least one parallelizable loop comprises determining an unroll factor based on a maximum number of iterations of a parallelizable loop, a number of elements in the array variable, and resources available on a programmable logic device; and wherein determining a build option for the array variable comprises determining a partition factor based on an unroll factor of a parallelizable loop accessing the array variable.

4. The method of claim 1, wherein determining a build option for the at least one parallelizable loop comprises determining an unroll factor, and wherein the unroll factor is determined by optimizing a cost-benefit ratio between increased calculation speed and increased resource consumption.

5. The method of claim 1, wherein resource consumption for a respective loop is determined by adding a specific resource consumption for each operation in a loop body of the respective loop, and wherein the specific resource consumption is read out from an operation library.

6. The method of claim 5, wherein the operation library is determined by implementing code comprising different possible operations in a specific programmable logic circuit, and wherein the specific resource consumption is measured from the implemented code.

7. The method of claim 1, wherein latency for a respective loop is determined based on a specific latency for each operation in a loop body of the respective loop, and wherein the specific latency is read out from an operation library.

8. The method of claim 7, wherein the operation library is determined by implementing code comprising different possible operations in a specific programmable logic circuit, and wherein the specific latency is measured from the implemented code.

9. The method of claim 1, wherein for multiple parallelizable loops, unroll factors of the multiple parallelizable loops are determined by optimizing a combined cost-benefit function for the multiple parallelizable loops, and wherein available resources of a specific programmable logic device form a boundary condition for the optimization.

10. The method of claim 1, wherein for multiple parallelizable loops and/or multiple array variables, one or more of the following constraints are imposed:

unroll factors for each parallelizable loop accessing a specific array are the same; or partition factors for multiple array variables accessed in the same parallelizable loop are the same.

11. The method of claim 1, wherein determining build options for multiple parallelizable loops and multiple array variables comprises:

determining a cluster of interdependent parallelizable loops and array variables, wherein for a first parallelizable loop in the cluster, each array variable accessed by the first parallelizable loop is added to the cluster, wherein for a first array variable in the cluster, each parallelizable loop accessing the first array variable is added to the cluster, and wherein an unroll factor for all parallelizable loops in the cluster is chosen based on optimizing a combined cost-benefit ratio for the cluster, the combined cost-benefit ratio being calculated by adding costs for all parallelizable loops in the cluster, adding benefits for all parallelizable loops in the cluster, and determining a ratio of both sums.

12. The method of claim 1, wherein inserting the build pragmas based on the determined build options in the intermediate representation comprises one or more of:

inserting an unroll pragma for the at least one parallelizable loop;

inserting a partition pragma for the array variable, wherein the partition pragma specifies partitioning an array into a number of smaller arrays, and wherein subsequent elements of the array variable are located in different smaller arrays; or inserting a pipeline pragma for at least one respective parallelizable loop, wherein pipeline pragmas are insertable in any parallelizable loop that is not completely unrolled.

13. The method of claim 1, wherein the intermediate representation comprises at least one function body, and wherein the method further comprises:

determining a resource consumption of the at least one function body;

determining a number of calls to a function; and inserting a function inlining pragma in the intermediate representation based on the resource consumption being lower than a predefined resource threshold and the function being called less often than a predefined call threshold.

14. The method of claim 1, further comprising:

configuring a control unit, wherein the control unit comprises at least one programmable logic device, and wherein configuring the control unit comprises:

implementing the source code for execution on the at least one programmable logic device of the control unit via a high-level synthesis toolchain to generate a bitstream, wherein the bitstream depends on the build pragmas;

transmitting the bitstream to the control unit; and storing the bitstream on a non-volatile memory of the control unit and/or configuring the at least one programmable logic device of the control unit with the bitstream.

15. A non-transitory computer-readable medium having processor-executable instructions stored thereon for generating source code from one or more blocks of a block diagram that comprises at least two blocks, including a source block emitting a matrix signal corresponding to an array variable and an operation block receiving the matrix signal and emitting an output signal based on an operation applied to the matrix signal, wherein the processor-executable instructions, when executed, facilitate:

transforming the block diagram into an intermediate representation, wherein transforming the block diagram into the intermediate representation comprises transforming the at least two blocks, and wherein at least one loop results from transforming the operation block;

identifying at least one candidate loop in the intermediate representation, wherein a loop body of the at least one candidate loop comprises at least one instruction that accesses the array variable;

identifying at least one parallelizable loop from the at least one candidate loop;

determining a build option for the at least one parallelizable loop;

determining a build option for the array variable;

inserting build pragmas based on the determined build options in the intermediate representation; and translating the intermediate representation into the source code.

\* \* \* \* \*